United States Patent
Yanagi et al.

(10) Patent No.: US 9,850,940 B2
(45) Date of Patent: Dec. 26, 2017

(54) DUST COVER FOR BALL JOINT

(71) Applicant: NOK CORPORATION, Tokyo (JP)

(72) Inventors: Tokunori Yanagi, Makinohara (JP); Tatsuro Hosen, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/034,201

(22) PCT Filed: Feb. 5, 2015

(86) PCT No.: PCT/JP2015/053205
§ 371 (c)(1),
(2) Date: May 4, 2016

(87) PCT Pub. No.: WO2015/122341
PCT Pub. Date: Aug. 20, 2015

(65) Prior Publication Data
US 2016/0273578 A1    Sep. 22, 2016

(30) Foreign Application Priority Data

Feb. 13, 2014 (JP) ................................ 2014-024977

(51) Int. Cl.
*F16C 11/06* (2006.01)
*F16J 3/04* (2006.01)
*F16J 15/52* (2006.01)

(52) U.S. Cl.
CPC ............ *F16C 11/0671* (2013.01); *F16J 3/04* (2013.01); *F16J 3/041* (2013.01); *F16J 15/52* (2013.01); *F16C 2226/10* (2013.01)

(58) Field of Classification Search
CPC ...... F16J 3/041; F16J 15/52; F16J 3/04; F16J 3/00; F16C 2226/10; F16C 11/0671
See application file for complete search history.

(56) References Cited

U.S. PATENT DOCUMENTS 1,704,740 A    3/1929    Gulick
7,510,344 B2 *  3/2009    Kondoh ............... B62D 7/166
                                                   403/135
(Continued)

FOREIGN PATENT DOCUMENTS

EP    1035337 A2    9/2000
EP    2657552 A2    10/2013
(Continued)

OTHER PUBLICATIONS

Extended European Search Report for Patent Application No. EP15749547.4 dated Dec. 14, 2016 (5 pages).

*Primary Examiner* — Eugene G Byrd
(74) *Attorney, Agent, or Firm* — Harness, Dickey & Pierce, P.L.C.

(57) ABSTRACT

In a dust cover for a ball joint, one end of a ball stud is retained within a socket, the other end is fixed by fastening a knuckle having a notch portion, one end large-diameter and other end small-diameter opening portions are respectively retained to the socket and the shaft, and a plate member is retained between an inner peripheral surface of the knuckle and an outer peripheral surface of the shaft. The plate member is constructed by an annular plate member, an elastic annular seal portion integrally formed in an inner peripheral side of the annular plate member, and an elastic engagement projection in the annular plate member in the knuckle side, and engaging with the notch portion. The annular seal portion is retained in a compression manner between an annular step portion in an inner peripheral surface of the knuckle and an outer peripheral surface of the shaft.

4 Claims, 5 Drawing Sheets

(56) References Cited

U.S. PATENT DOCUMENTS

| | | | | |
|---|---|---|---|---|
| 8,137,021 B2* | 3/2012 | Bohne | ............... | F16C 11/0638 |
| | | | | 403/135 |
| 9,254,867 B2* | 2/2016 | Hosen | ............... | F16C 11/0671 |
| 9,416,818 B2* | 8/2016 | Hosen | ............... | F16J 3/041 |
| 9,528,547 B2* | 12/2016 | Hosen | ............... | F16J 3/042 |
| 2003/0156896 A1* | 8/2003 | Suzuki | ............... | B60G 7/005 |
| | | | | 403/134 |
| 2003/0202842 A1* | 10/2003 | Abels | ............... | F16C 11/0671 |
| | | | | 403/134 |
| 2004/0028302 A1* | 2/2004 | Abels | ............... | F16C 11/0671 |
| | | | | 384/206 |
| 2008/0036159 A1* | 2/2008 | Yanagi | ............... | F16J 15/3212 |
| | | | | 277/594 |
| 2014/0284885 A1* | 9/2014 | Ishimori | ............... | F16C 11/0671 |
| | | | | 277/635 |
| 2015/0176639 A1* | 6/2015 | Sato | ............... | F16C 11/0671 |
| | | | | 277/635 |

FOREIGN PATENT DOCUMENTS

| | | | | |
|---|---|---|---|---|
| JP | S58-130118 U | 9/1983 | | |
| JP | H5-38469 U | 5/1993 | | |
| JP | H11-63245 A | 3/1999 | | |
| JP | WO 2013069411 A1 * | 5/2013 | ............... | F16C 11/0671 |

\* cited by examiner

DUST COVER FOR BALL JOINT

CROSS-REFERENCE TO RELATED APPLICATIONS

This application is a 371 U.S. National Stage Application of International Application No. PCT/JP2015/053205, filed on Feb. 5, 2015, and published in Japanese as WO 2015/122341 A1 on Aug. 20, 2015. This application claims priority to Japanese Application No. 2014-024977, filed on Feb. 13, 2014. The entire disclosures of the above applications are incorporated herein by reference.

BACKGROUND OF THE INVENTION

Field of the Invention

The present invention relates to a dust cover for a ball joint.

Further, the present invention relates to a dust cover for a ball joint which is used in an automobile suspension device, and a steering device.

Description of the Conventional Art

Conventionally, in a ball joint to which a dust cover is installed for the purpose of a dust prevention and a water prevention in a ball joint coupling portion, the ball joint has been classified into two kinds including a taper alignment ball joint as shown in FIG. 5, and a pinch bolt type ball joint as shown in FIGS. 6 and 7.

These two kinds of ball joints are different mainly in a fastening method between a knuckle and a stud.

In the taper alignment ball joint shown in FIG. 5, a position of a knuckle 500 is decided at a position where a taper surface of a shaft 400 of a ball stud 100 overlaps.

More specifically, since the taper alignment ball joint is structured such that no gap exists between a surface of the shaft 400 and the knuckle 500, water and dusts can be prevented from entering into a dust cover 600 by bringing a dust lip 710 provided in the other end small-diameter opening portion 700 of the dust cover 600 into contact with a lower surface of the knuckle 500 (a surface in the dust cover 600 side).

However, the pinch bolt type ball joint shown in FIGS. 6 and 7 is structured such that a knuckle 500 is provided with a notch portion 510 which reaches a surface of a shaft 400 from the knuckle outer peripheral surface, a gap of the notch portion 510 is narrowed by being fastened by a fastening means 520 such as a bolt, and the knuckle 500 is fixed to the shaft 400.

As a result, even if the dust lip 710 as shown in FIG. 5 is provided in the other end small-diameter opening portion 700 of a dust cover 600 shown in FIG. 7, the water and the dusts can not be prevented from entering into the dust cover 600.

Further, there has been made an attempt to arrange a washer-like seal member in a lower surface of the knuckle (a surface in the dust cover side), however, the water and the dusts could not be prevented from entering into the dust cover (Japanese Unexamined Utility Model Publication No. 58-130118).

Particularly, since the washer-like seal member rotates together with the knuckle according to an oscillating and rotating motion of the knuckle, a sealing performance is lowered.

As a countermeasure for preventing the corotation, there has been proposed a structure in which a convex portion corresponding to the notch portion of the knuckle is provided in a surface of the washer-like seal member, however, it has been impossible to completely prevent the corotation.

SUMMARY OF THE INVENTION

Problem to be Solved by the Invention

The present invention is made by taking the problem into consideration, and an object of the present invention is to provide a dust cover for a ball joint in which a sealing performance of the other end small-diameter opening portion is good in a pinch bolt type ball joint, and corotation of a plate member can be securely prevented.

Means for Solving the Problem

A dust cover for a ball joint according to the present invention is a dust cover for a ball joint structured such that a spherical head portion formed in one end of a ball stud is retained within a socket, a shaft in the other end of the ball stud is fixed to a knuckle having a notch portion by fastening the knuckle by means of a fastening means, a one end large-diameter opening portion is fixed and retained to an outer peripheral surface of the socket, the other end small-diameter opening portion is retained to the shaft, and a plate member is retained between an inner peripheral surface of the knuckle in the other end small-diameter opening portion side and an outer peripheral surface of the shaft, wherein the plate member is constructed by an annular plate member which is made of a hard material, an annular seal portion which is integrally formed in an inner peripheral side of the annular plate member and is made of a rubber-like elastic material, and an engagement projection which is provided in a surface of the annular plate member in the knuckle side, engages with the notch portion and is made of a rubber-like elastic material, and the annular seal portion is retained in a compression manner between an annular step portion which is provided in an inner peripheral surface of the knuckle and an outer peripheral surface of the shaft.

Effect of the Invention

The present invention achieves effects as described below. According to the dust cover for the ball joint of the invention described in the first claim, the plate member is constructed by the annular plate member which is made of the hard material, the annular seal portion which is integrally formed in the inner peripheral side of the annular plate member and is made of the rubber-like elastic material, and the engagement projection which is provided in the surface of the annular plate member in the knuckle side, engages with the notch portion and is made of the rubber-like elastic material, and the annular seal portion is retained in a compression manner between the annular step portion which is provided in the inner peripheral surface of the knuckle and the outer peripheral surface of the shaft. As a result, it is possible to securely prevent the water and the dusts from entering into the dust cover, and it is possible to securely prevent the corotation of the plate member by the engagement projection made of the rubber-like elastic material.

Further, according to a dust cover for a ball joint of the invention described in a second claim, a seal lip portion coming into contact with the outer peripheral surface of the shaft is formed in an inner peripheral surface of the annular seal portion. As a result, it is possible to more securely prevent the water and the dusts form entering into the dust cover.

Further, according to a dust cover for a ball joint of the invention described in a third claim, a dust lip provided in the other end small-diameter opening portion comes into close contact with the annular plate member. As a result, the same water prevention and dust prevention effect as that of the taper alignment ball joint can be obtained even in the pinch bolt type ball joint.

DETAILED DESCRIPTION OF PREFERRED EMBODIMENT

Figure 1:
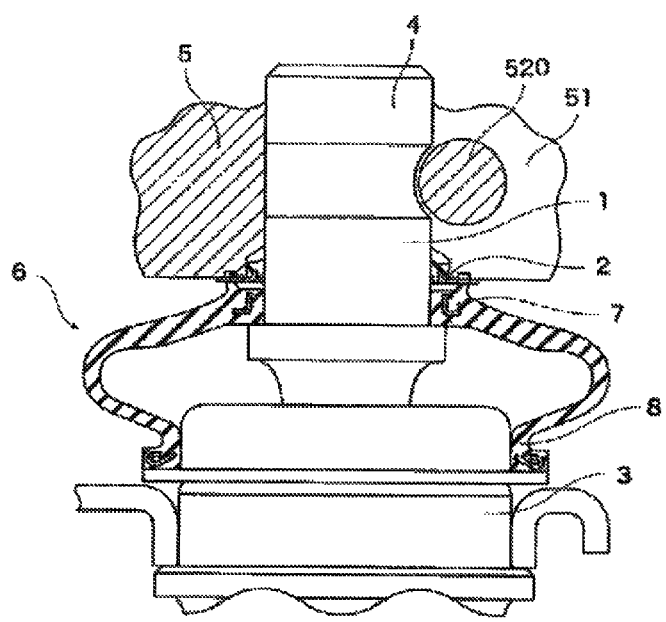
FIG. 1 is a vertical cross-sectional view of a dust cover for a ball joint according to the present invention in the case that the dust cover for the ball joint is cut in the same manner as a cross section along a line B-B in FIG. 6 showing a prior art.
Figure 2:
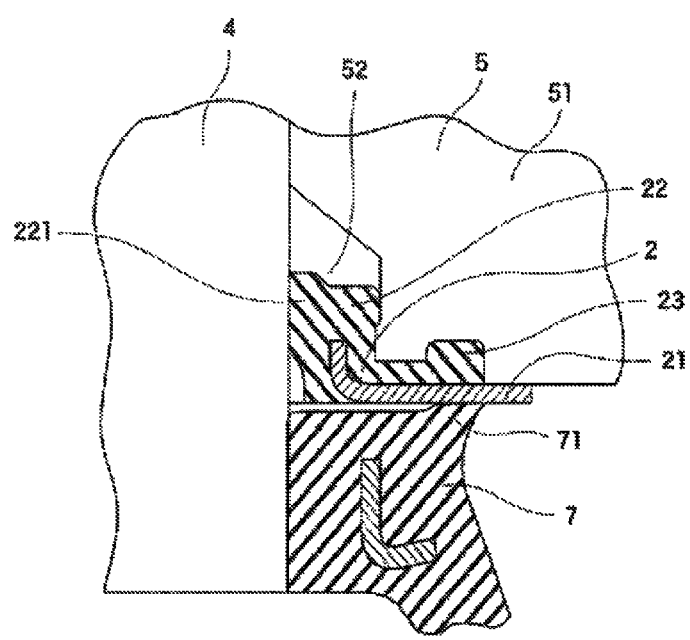
FIG. 2 is a partly enlarged view of FIG. 1.
Figure 3:
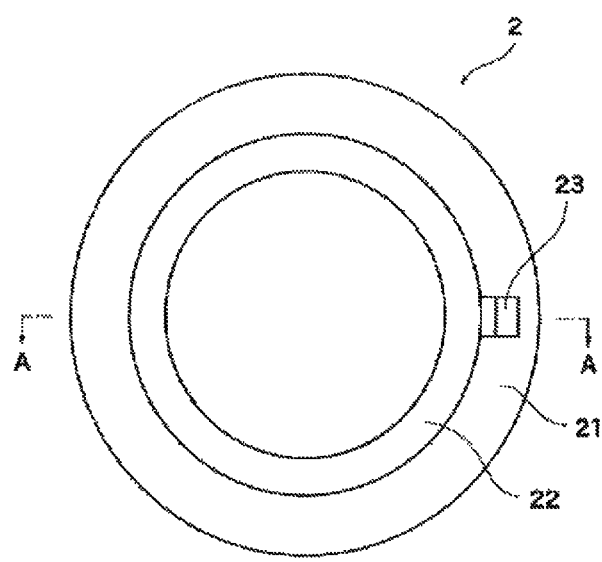
FIG. 3 is a plan view of a plate member which is used in FIG. 1.

A description will be given below of a mode for carrying out the present invention.

As shown in FIGS. 1, 2, 3 and 4, a dust cover 6 for a ball joint according to the present invention is structured such that a spherical head portion formed in one end of a ball stud 1 is retained within a socket 3, and a shaft 4 in the other end of the ball stud 1 is fixed to a knuckle 5 side by fastening the knuckle 5 by a fastening means 520 such as a bolt.

Further, the dust cover 6 is structured such that a one end large-diameter opening portion 8 is fixed and retained to an outer peripheral surface of the socket 3, and the other end small-diameter opening portion 7 is retained to the shaft 4.

Further, a basic structure is provided by that the plate member 2 is retained between an inner peripheral surface of the knuckle 5 in the other end small-diameter opening portion 7 side and an outer peripheral surface of the shaft 4.

This kind of knuckle 5 is used in the pinch bolt type ball joint, and is fastened and fixed onto the outer peripheral surface of the shaft 4 by the fastening means 520 such as the bolt, and an annular step portion 52 is formed in the inner peripheral surface of the knuckle 5 in the other end small-diameter opening portion 7 side (a lower surface side on the drawing).

Further, the plate member 2 is constructed by an annular plate member 21 which is made of a hard material, an annular seal portion 22 which is integrally formed in an inner peripheral side of the annular plate member 21 and is made of a rubber-like elastic material, and an engagement projection 23 which is provided in a surface of the annular plate member 21 in the knuckle 5 side, engages with a notch portion 51 and is made of a rubber-like elastic material, and the annular seal portion 22 is retained in a compression manner between an annular step portion 52 which is provided in an inner peripheral surface of the knuckle 5 and an outer peripheral surface of the shaft 4.

As mentioned above, the annular seal portion 22 is inserted between the annular step portion 52 provided in the inner peripheral surface of the knuckle 5 and the outer peripheral surface of the shaft 4, the knuckle 5 is thereafter fastened by the fastening means 520 such as the bolt, and a gap of the notch portion 51 is reduced. As a result, since the annular seal portion 22 is compressed between the annular step portion 52 and the outer peripheral surface of the shaft 4, a good sealing state can be achieved.

Figure 4:
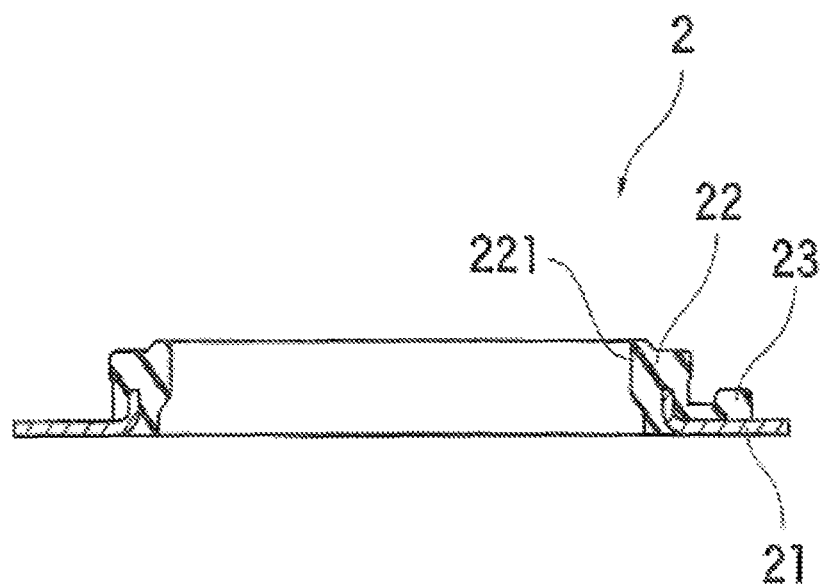
FIG. 4 is a cross-sectional view along a line A-A in FIG. 3.
Figure 5:
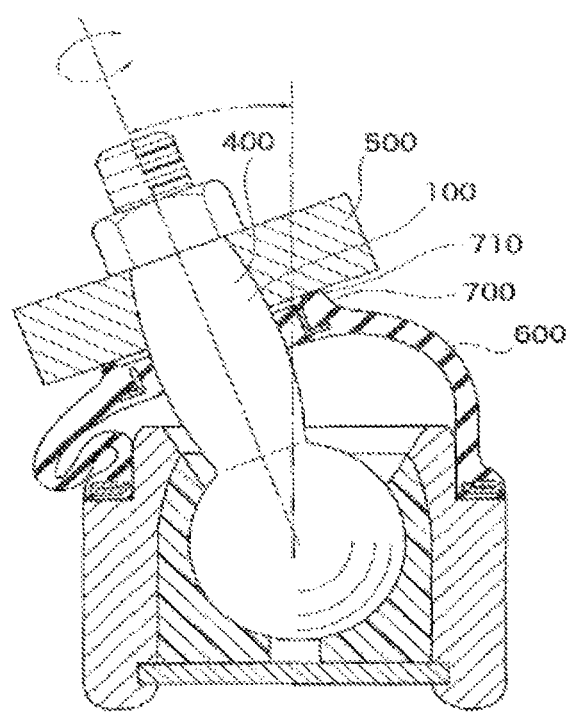
FIG. 5 is a vertical cross-sectional view of a taper alignment ball joint according to the prior art.
Figure 6:
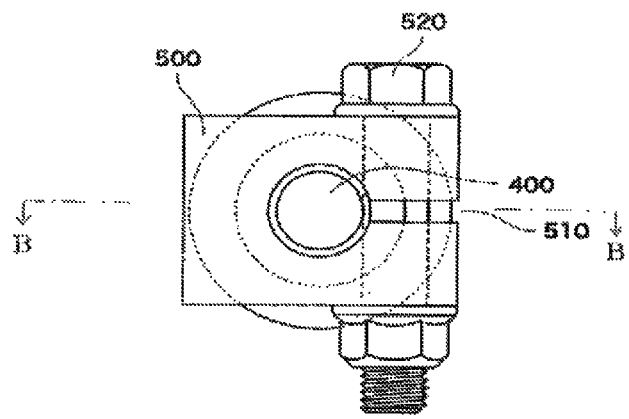
FIG. 6 is a top elevational view of a pinch bolt type ball joint according to the prior art.
Figure 7:
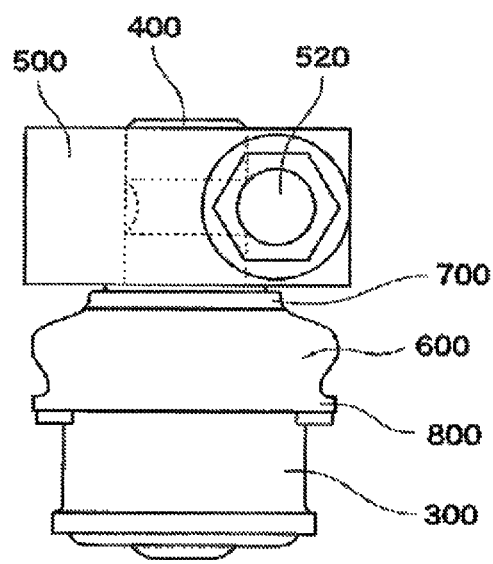
FIG. 7 is a side elevational view of FIG. 6.

Further, as shown in FIG. 4, since a seal lip portion 221 coming into contact with an outer peripheral surface of the shaft 4 is provided in an inner peripheral surface of the annular seal portion 22, it is possible to more securely achieve the seal between the annular seal portion 22 and the outer peripheral surface of the shaft 4.

In the same manner, since the engagement projection 23 made of the rubber-like elastic material is inserted into the gap of the notch portion 51, the knuckle 5 is thereafter fastened by the bolt means 520, and the gap of the notch portion 51 is reduced, it is possible to maintain a state in which the engagement projection 23 is securely retained to the notch portion 51. As a result, it is possible to securely prevent the corotation of the plate member 2 in relation to the knuckle 5, and a stable sealing performance can be maintained.

Further, since a dust lip 71 coming into close contact with a lower surface of the annular plate member 21 is provided in the other end small-diameter opening portion 7, it is possible to obtain the same water prevention and dust prevention effects as those of the taper alignment ball joint, even in the pinch bolt type ball joint.

Further, a metal material and a resin material can be appropriately selected and employed as a material of the annular plate member 21.

Further, a material of the dust cover 6 employs by appropriately selecting from rubber-like elastic materials such as chloroprene, polyester elastomer and thermoplastic elastomer such as thermoplastic polyurethane in conformity to intended use.

Further, grease is sealed into the dust cover 6.

On the other hand, a metal reinforcing ring is buried and integrated into the other end small-diameter opening portion 7 and the one end large-diameter opening portion 8 of the dust cover 6.

Further, it goes without saying that the present invention is not limited to the best mode for carrying out the invention mentioned above, but can employ the other various structures without deviating from the scope of the present invention.

INDUSTRIAL APPLICABILITY

The present invention can be used for the ball joint which is used in the suspension device, the steering device and so on of the motor vehicle.

What is claimed is:

1. A dust cover configured for use with a ball joint that includes a ball stud having a spherical head portion and a shaft, a socket, and a knuckle, the spherical head portion of the ball stud being retained within the socket, and the shaft of the ball stud being fixed to the knuckle, the knuckle including a notch portion, and an annular step portion that is provided on an inner peripheral surface of the knuckle, the dust cover comprising:

a first end large-diameter opening portion that is configured to be fixed and retained to an outer peripheral surface of the socket;

a second end small-diameter opening portion that is configured to be retained to an outer peripheral surface of the shaft; and a plate member that is separate and apart from the second end small-diameter opening portion, and that is at least partially positioned between the inner peripheral surface of the knuckle located at a second end small-diameter opening portion side of the knuckle and the outer peripheral surface of the shaft, wherein the plate member includes an annular plate member that is made of a hard material, an annular seal portion that is integrally formed on an inner peripheral side of the annular plate member and is made of a rubber-like elastic material, and an engagement projection which is provided on the annular seal portion, engages with the notch portion of the knuckle, and is made of a rubber-like elastic material, and wherein the annular seal portion is configured to be compressed between the annular step portion of the knuckle and the outer peripheral surface of the shaft.

2. The dust cover according to claim 1, wherein a seal lip portion that contacts with the outer peripheral surface of the shaft is formed on an inner peripheral surface of the annular seal portion.

3. The dust cover according to claim 1, wherein a dust lip provided on the second end small-diameter opening portion that contacts the annular plate member.

4. The dust cover according to claim 2, wherein a dust lip provided on the second end small-diameter opening portion that contacts the annular plate member.

* * * * *